April 16, 1963   C. JEAN-LOUIS A. J. LINDET   3,085,822
ASSEMBLY OF TUBES AND RODS
Filed Feb. 21, 1961   2 Sheets-Sheet 1
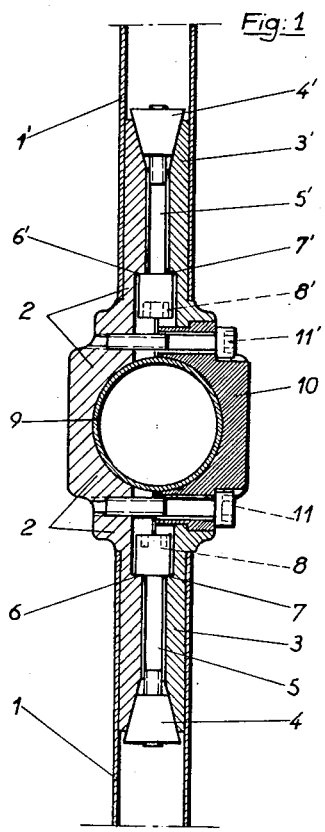
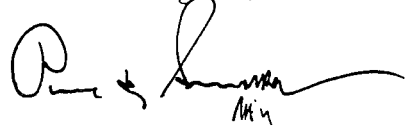

April 16, 1963  C. JEAN-LOUIS A. J. LINDET  3,085,822
ASSEMBLY OF TUBES AND RODS
Filed Feb. 21, 1961  2 Sheets-Sheet 2
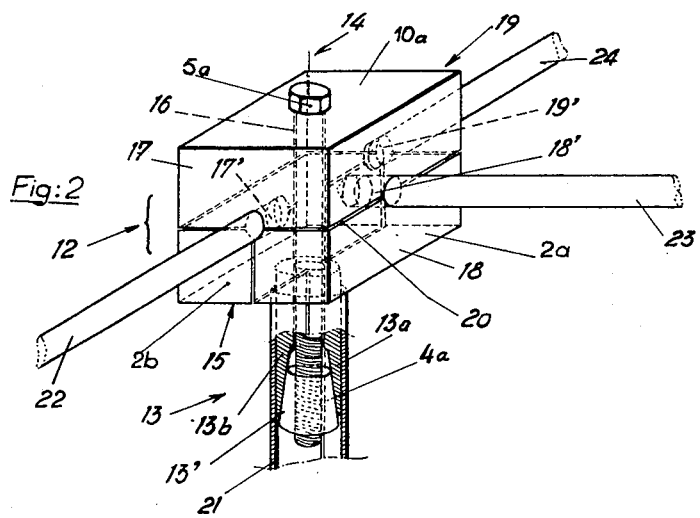
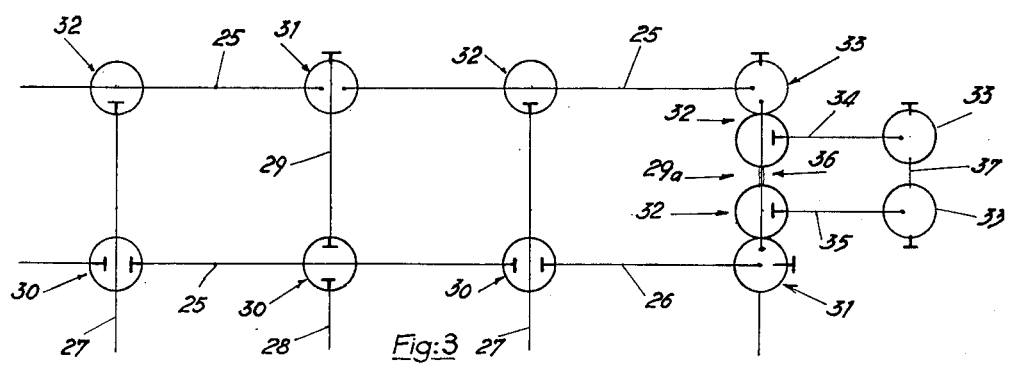

United States Patent Office 3,085,822
Patented Apr. 16, 1963

3,085,822
ASSEMBLY OF TUBES AND RODS
Christian Jean-Louis André Joseph Lindet, Paris, France, assignor to Societe d'Etudes de Manufention et d'Equipements Industriels S.E.M.E.I., Paris, France, a company of France
Filed Feb. 21, 1961, Ser. No. 90,833
Claims priority, application France Feb. 26, 1960
4 Claims. (Cl. 287—54.1)

The present invention relates to a device which enables hollow tubes or rods to be assembled together, some of which have been drilled at their extremities with a longitudinal blind hole.

In order to simplify the description, in the text which follows, only tubes will be referred to, it being understood that in the present case, this term applies indifferently to actual tubes or to rods prepared in such manner that the fixing device can pass sufficiently into the interior of these bars as if they were really tubes.

The invention is more especially concerned with metal scaffolding, but it also has applications in other fields such as the temporary structures erected in laboratories and barriers for preventing cattle from wandering.

It will of course be understood that in the following description where reference is made to external clamping preventing all movements of rotation or sliding of the fixing device, a simple reduction of the external diameter of certain tubes will transform this fixed assembly into an assembly capable of a movement of rotation or sliding. In this way, it will still fall within the scope of the invention to construct a barrier for cattle provided with a door, an embodiment of which will be shown later, given by way of example.

The majority of devices provided for rigidly fixing several tubes to each other in predetermined relative positions (end to end, at right angles, at 60°, etc.) essentially comprise collars which grip the tubes with clamping systems, generally of the screw and nut type. The applicant has found that it is also possible to utilize for all or at least a part of the assembly of tubes, an internal clamping device which presents a number of substantial advantages, mainly the reduction of the number of screws to be tightened in order to ensure fixation. One of the examples of embodiment described below comprises four tubes assembled together in a rigid manner by a single screw.

The present invention therefore consists of a device for fixing tubes together, characterized in that some of the parts which constitute the device pass into the extremity of at least one of the cut tubes and are locked therein by an expansion system, the clamping being effected by means of an internal nut having an at least partly conical outer surface and tending to force apart the various parts of the device which pass into the interior of the tube referred to, the said parts being locked in position when the fixing bolt is tightened.

The following description of various examples of embodiment of the invention will be readily understood by reference to the figures of the accompanying drawings, it being understood that the examples given are in no way limitative with regard to the invention.

FIG. 1 shows a cross-shaped assembly of an uncut tube and two cut tubes;

FIG. 2 relates to four tubes, of which three are coplanar, forming two adjacent right angles connected to a tube perpendicular to their plane;

FIG. 3 is concerned with a barrier comprising a movable door.

FIG. 1 is a cross-section of the cross assembly. In this figure is shown the tube 1 closed by the members 2 and 3 which are held assembled with the tube 1 by the conical nut 4 which is tightened by the threaded rod 5 rigidly fixed to a female hexagon head 8 in abutment with the shoulders 6, 7 of the members 2, 3; said head 8 can be turned by means of a key formed from a single piece of hexagonal rod bent to a right angle (not shown). The members 2 and 3 are simultaneously inserted in the tube 1, together with the cone 4, in which the threaded rod 5 has previously been screwed, after which the whole assembly is locked by means of the key. The fixing of the tube 1' symmetrical with the tube 1 is effected in a similar manner. The numbers marked with a dash or apostrophe which are employed for the fixing of this tube 1', are identical with those marked with the same number and used for the tube 1. It is to be noted that the length of the threaded rods 5 and 5' is sufficiently small for the assembly to be carried out without these two rods interfering with each other.

The tubes 1 and 1' are then fixed in line with each other by the member 2, which constitutes a half-collar. The tube 9 forming the second arm of the cross is fixed on this half-collar by clamping it with a half-collar 10 which fits on the members 3 and 3'. This half-collar 10 is screwed on the member 2 by means of hollow-headed bolts 11 and 11' which screw into threaded holes tapped in the member 2, the same key serving for tightening all the bolts.

The embodiment shown in FIG. 2 is constructed in the following manner. The first member is a block of material having the form of a cube 12 extended by a cylindrical portion 13, the axis 14 of which passes through the centre of the cube 12 perpendicular to the face 15, forming a kind of tail. This tail 13 is pierced with a conical cavity 13' and the block is then drilled axially with a narrow passage 16 intended to receive the assembly screw 5a, and three blind holes 17', 18' and 19' are also drilled in the centres of three consecutive faces 17, 18 and 19. The member thus prepared is sawn through along the plane 20 of the axes of the said blind holes, and the half of the cube which carries the tail is again cut into two parts 2a, 13a and 2b, 13b. There are thus formed two members 2a, 13a and 2b, 13b which play the same part in the assembly as the parts 2 and 3 of the form of embodiment shown in FIG. 1, and a member 10a which will carry out the same function as the member 10 of the said embodiment. The locking of the whole assembly, comprising the parts which have just been described and the tubes 21, 22, 23 and 24 will be effected in this case by a single bolt 5a with a long shank co-operating with a conical nut 4a. All the parts will be fitted one into the other and it will then only be necessary to tighten the bolt 5a in the nut 4a by means of its hexagon head and an ordinary key for the whole assembly to be formed as a rigid unit.

It will of course be understood that the same device can be applied to the coupling of a different number of tubes, for example to the constitution of a star, by replacing the cube by a hexagonal prism and piercing only three blind holes, one on each alternate lateral face. It is of course possible to construct the different parts of the assembly separately instead of obtaining them by cutting-up a single block, without departing from the scope of the invention.

In order to show an application of the system of assembly which constitutes the invention, FIG. 3 represents diagrammatically a dismantleable barrier provided with a gate, the whole being made-up of tubes coupled together in accordance with the system previously described. For simplicity of illustration, all these assemblies have been shown as having the external shape of a sphere.

Each horizontal tube is a tube 25 having a length double the distance between two supports, except for the tube 26. The vertical tubes are alternately of one piece (tubes such as 27) and of two pieces (such as the tubes 28, 29). The assemblies on the lower horizontal line are all of the same type 30, except the end assembly 31, but they are mounted alternately in different directions. In order to make the diagram clearer, each assembly has been represented by a circle; the tubes are repreesnted by a line terminating in a point indicating the extremity, and the assembly bolts are shown by a T. The assemblies 30 comprise two members similar to the member 2 of the form of embodiment corresponding to FIG. 1. It will be observed that the rod 25 passing through the assemblies 30 is not clamped there and the latter assemblies are not provided with an apparent bolt such as the bolts 11 or 11' of FIG. 1.

The assemblies of the upper horizontal line are alternately of the type of the form of embodiment of FIG. 2 with locking by a single external bolt (but with two opposite arms instead of three in a star), and of a type similar to that of FIG. 1, but with an internal bolt which does not clamp the horizontal tube.

The first of these assemblies is indicated at 31 and the second type is shown at 32. The end assembly of the lower horizontal rod is of the same type as 31; the assembly constituting an angle and marked 33 is of the type having a single external bolt, derived from the form of embodiment shown in FIG. 2.

However, before mounting these two end assemblies 31 and 33, there are threaded on the last rod 29a two assemblies of the type 32 with a single internal clamping, on which the tubes 34 and 35 forming the horizontal bars of the gate had been previously mounted, the distance apart of these two assemblies 32 capable of rotating round the tube 29a being fixed by a tube 36 of larger diameter and threaded over the said tube 5. The last side of the gate is formed by a vertical tube 37, coupled to the two tubes 34 and 35 by assemblies identical with that shown at 33.

It will be noted that the various assemblies employed do not comprise more than one external bolt, and that the majority are not provided with any bolt at all, and that there is no need to pierce any tube.

What is claimed is:

1. A device for connecting a first rodlike member and at least one second rodlike member in substantially radially therefrom extending position, said second rodlike member being tubular at least at its attached end, comprising in combination
   (a) clamping means composed of two complementary components embracing said first rodlike member,
   (b) at least one circumferentially expansible cylindrical projection extending from one of said clamping components in substantially radial direction relative to the axis of said first rodlike member, said projection inwardly fitting the tubular end of the second rodlike member,
   (c) actuating means for circumferentially expanding said projection within the tubular end of the second rodlike member into gripping position,
   (d) and means to unify said clamping components to fasten the same on the first rodlike member.

2. A device for connecting a first rodlike member and at least one second rodlike member in substantially radially therefrom extending position, said second rodlike member being tubular at least at its attached end, comprising in combination
   (a) a sleeve composed of two complementary half-sleeves fitted to clamp said first rodlike member,
   (b) at least one circumferentially expansible cylindrical projection extending from one half-sleeve in substantially radial direction relative to the axis of said first rodlike member, said projection fitting the tubular end of the second rodlike member,
   (c) actuating means for circumferentially expanding said projection within the tubular end of said second rodlike member,
   (d) and means to unify said half-sleeves to fasten the same on said first rodlike member.

3. A device according to claim 1 comprising an axial bore in said expansible projection, a tapered portion and a shoulder in said bore,
   a conical nut fitting said tapered portion and a bolt within said bore; a threaded portion on said bore adapted to engage said unit; and an operable head on said bolt.

4. A device according to claim 1 wherein
   (a) said clamping means comprise a body divided by a first plane into a first and a second body component,
   (b) said second body component again divided into two parts by a second plane substantially perpendicular to the first plane,
   the first plane,
   (c) a first bore extending substantially centrally in said body with its axis located in said second plane and substantially perpendicular to said first plane,
   (d) at least one second bore in said body extending substantially radially relative to the axis of the first bore with its axis located in said first plane, said second bore adapted to receive and hold a first rodlike member,
   (e) a cylindrical projection coaxial with said first bore and composed of two complementary elements, each element extending from one of said parts of said second body component, said projection fitting the tubular end of the second rodlike member,
   (f) a bolt within said first bore having a threaded portion and an operable head outwardly abutting said first body component,
   (g) a tapered portion within said first bore,
   (h) and a conical nut fitting said tapered portion and engageable by said threaded portion of said bolt.

References Cited in the file of this patent
UNITED STATES PATENTS

| | | |
|---|---|---|
| 580,386 | Ehrman | Apr. 13, 1897 |
| 655,581 | Rishel | Aug. 7, 1900 |
| 656,950 | Dikeman | Aug. 28, 1900 |
| 3,028,938 | Schorr | Apr. 10, 1962 |